H. G. MILLER.
DIRECTION INDICATOR.
APPLICATION FILED MAY 28, 1915.

1,170,770.

Patented Feb. 8, 1916.
2 SHEETS—SHEET 1.

WITNESSES:
Samuel S. Matthes
Pearl M. Juncher

INVENTOR
Howard G. Miller
BY
John H. Bro
his Attorney

H. G. MILLER.
DIRECTION INDICATOR.
APPLICATION FILED MAY 28, 1915.
1,170,770.
Patented Feb. 8, 1916.
2 SHEETS—SHEET 2.
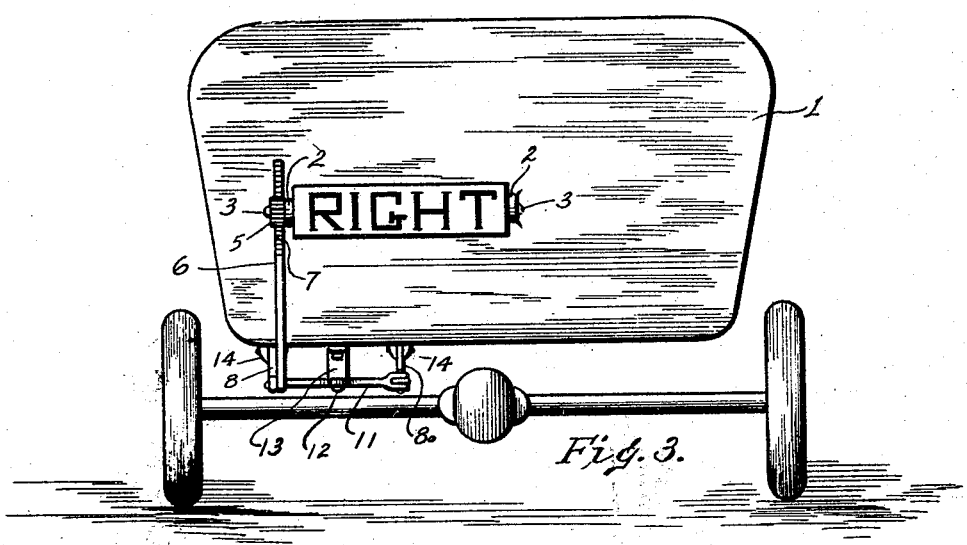
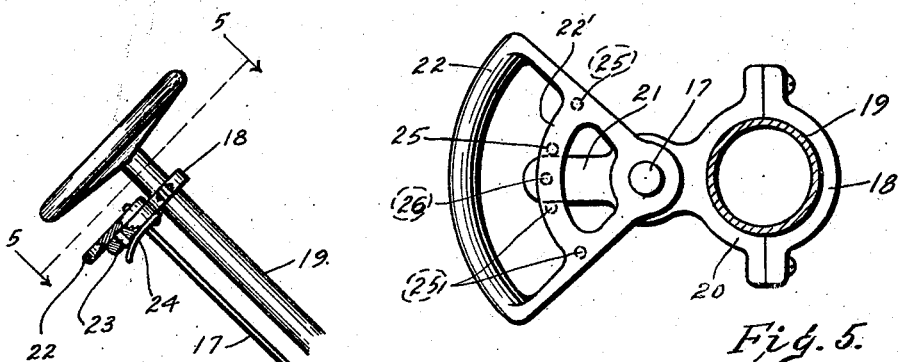
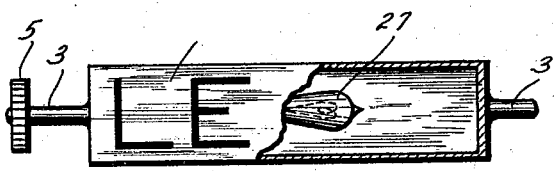
WITNESSES:
INVENTOR
Howard G. Miller
BY
Attorney

UNITED STATES PATENT OFFICE.

HOWARD G. MILLER, OF MANSFIELD, OHIO.

DIRECTION-INDICATOR.

1,170,770.   Specification of Letters Patent.   Patented Feb. 8, 1916.

Application filed May 28, 1915. Serial No. 31,076.

*To all whom it may concern:*

Be it known that I, HOWARD G. MILLER, a citizen of the United States of America, residing at Mansfield, in the county of Richland and State of Ohio, have invented certain new and useful Improvements in Direction-Indicators, of which the following is a specification.

This invention pertains to certain new and useful improvements in direction indicators with particular reference to an indicator for automobiles and it has for its primary aim to provide a device of the foregoing character embodying simplicity, durability and novelty of construction to thereby render the same efficient in operation.

A further object of this invention is to provide means whereby the driver of an automobile can at the same time and with one movement indicate to a vehicle following and a vehicle coming toward him the direction which he contemplates taking.

Other objects will be set forth hereinafter and these features of construction, arrangement and combination of parts on which protection is desired will be defined succinctly in the appended claim.

Figure 1:
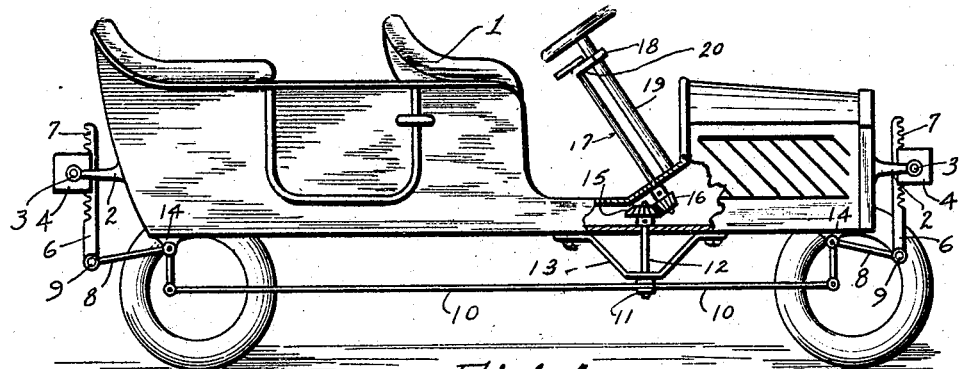
Figure 2:
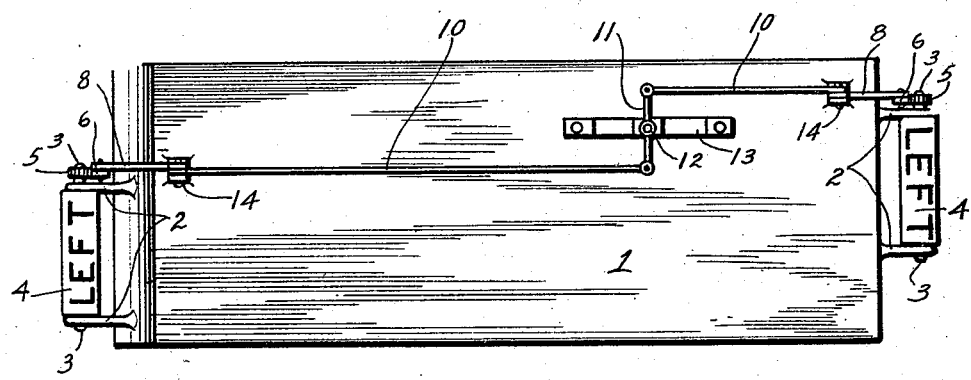

For a full understanding of the invention, reference is to be had to the following specification and the accompanying drawings in which similar characters of reference denote corresponding parts throughout and Figure 1 shows the present invention applied to an automobile, a portion of the latter being in section; Fig. 2 is a bottom plan thereof; Fig. 3 illustrates the same in rear elevation; Fig. 4 is a fragmentary view of the steering mechanism having the operating mechanism of the invention applied thereto; Fig. 5 is a section on line 5—5 of Fig. 4; and Fig. 6 is a detailed view of one of the signals.

Having particular reference to the drawings, 1 designates the vehicle or automobile having pairs of brackets 2 fixed to the front end or radiator and rear end of the car, the brackets of each pair being formed with alined bearings in which the trunnions 3 of the signal boxes 4 are journaled, one trunnion being extended for having a pinion 5 fixed thereto. Each signal box may be of any size and shape although, for convenience, a four-sided casing is illustrated, the faces of which are to bear, in stenciled or transparent characters, suitable signals as "Right", "Left", "Go ahead", and "Stop".

Interposed between the car body and each pinion 5, is a bar 6 formed with a rack 7 a portion of its length for meshing with the respective pinion, and pivotally connected to the longer arm of a bell-crank lever 8, as at 9, to be supported and operated thereby. The shorter arms of the bell cranks 8 are connected by links 10 to the opposite ends of a horizontal cross arm or lever 11 which is connected between its ends to and supported by the lower terminal of a vertical shaft 12, the latter being journaled in the car body and a bracket 13 mounted on the underside thereof. The bell cranks are pivoted to the car beneath the forward and rear ends of the latter, as shown at 14.

The upper end of vertical shaft 12 carries a bevel gear 15 which meshes with a second bevel gear 16 fixed on the lower end of a shaft 17. This shaft is journaled in the floor of the car and a bracket 18 which is of sectional formation to facilitate the clamping thereof to the mast 19 of the steering mechanism.

The inner section 20 of the bracket 18 is formed with an integral support 21 in an opening of which is a slidably disposed pin or pawl 23, the same being normally projected upwardly by a leaf spring 24 secured to the underside of the support 21. The pawl is adapted for selective engagement in a series of recesses 25 and 26 in the under face of an overlying segmental handle 22 which latter is secured to the projecting end of shaft 17. When the pawl 23 engages in any of the recesses 25, a corresponding signal is displayed whereas when the pawl engages in recess 26, which is neutral, no single signal is displayed.

It will be noted that the recesses are formed in an arcuate cross bar 22' which provides ample space for the hand of the operator to thoroughly grip the handle.

A conventional light 27 may be arranged within the casing for service at night.

What is claimed is:

An automobile direction indicator including an arm connected to the automobile and adapted for movement about its center, a signal mounted at each end of the automobile, and operating means between the respective ends of the arm and the respective signals, each of said operating means including a link, a movably supported bell crank lever, a rack bar and a pinion, the said link, bell crank, rack bar and a pinion operating in substantially the same vertical plane.

In testimony whereof I affix my signature in presence of two witnesses.

HOWARD G. MILLER.

Witnesses:
 JOHN H. COSS,
 PEARL M. YUNCHER.

Copies of this patent may be obtained for five cents each, by addressing the "Commissioner of Patents, Washington, D. C."